United States Patent [19]
Wallner
[11] Patent Number: 4,864,097
[45] Date of Patent: Sep. 5, 1989

[54] PLASMA ARC TORCH WITH CONFINED AND CONTROLLED PLASMA JET COLUMN

[75] Inventor: Manfred J. Wallner, Solingen, Fed. Rep. of Germany

[73] Assignee: Emerson Electric Co., St. Louis, Mo.

[21] Appl. No.: 248,729

[22] Filed: Sep. 23, 1988

[51] Int. Cl.[4] ..................... B23K 9/00
[52] U.S. Cl. ..................... 219/121.52; 219/75; 219/121.5; 219/121.48
[58] Field of Search ..................... 219/121.48, 121.50, 219/121.51, 121.52, 121.53, 74, 75; 313/231.31, 231.41, 231.51

[56] References Cited

U.S. PATENT DOCUMENTS

| | | | |
|---|---|---|---|
| 3,534,388 | 10/1970 | Ito et al. | 219/121.5 |
| 3,684,911 | 8/1972 | Perugini et al. | 219/121.5 |
| 3,914,573 | 10/1975 | Muehlberger | 219/121.5 |
| 4,430,546 | 2/1984 | Irons et al. | 219/121.5 |
| 4,455,470 | 6/1984 | Klein et al. | 219/121.5 |
| 4,682,005 | 7/1987 | Marhic | 219/121.5 |
| 4,701,590 | 10/1989 | Hutch | 219/121.5 |
| 4,748,312 | 5/1988 | Hutch et al. | 219/121.5 |

FOREIGN PATENT DOCUMENTS

| | | | |
|---|---|---|---|
| 0213364 | 10/1985 | Japan | 219/121.5 |

*Primary Examiner*—M. H. Paschall
*Attorney, Agent, or Firm*—Polster, Polster and Lucchesi

[57] ABSTRACT

A plasma arc torch is disclosed as having an elongated hollow body defining a plenum cavity into which an electrode is mounted. The body has a tip end section which is provided with an arc constricting orifice to permit gas injected into the plenum cavity to issue from the arc constricting orifice. Surrounding the arc constricting orifice on an outer surface of the tip end section is an outwardly extending enlarged head portion. Thus, when an arc is established between the tip and electrode in the vicinity of gas passing through the plenum cavity, an arc is formed which is confined and controlled by the outwardly extending enlarged head portion during operation, for example, on a workpiece. In order to start the arc within the center of the electrode, the electrode has a central part thereof in closest proximity to an inner surface of the body adjacent the arc constricting orifice.

8 Claims, 1 Drawing Sheet

PLASMA ARC TORCH WITH CONFINED AND CONTROLLED PLASMA JET COLUMN

BACKGROUND OF THE INVENTION

This invention relates to a plasma arc torch which can be used in a variety of plasma arc metal working processes including cutting, welding and other metal surface treatments.

Plasma arc torches operate by directing a plasma jet arc formed of ionized gas particles toward a workpiece. In the typical plasma torch operation, a gas to be ionized is injected within the plenum cavity of a torch tip around a charged electrode. The plasma then is directed through an arc constricting orifice formed in the tip. A sufficiently high voltage is applied to the torch tip to cause a spark to jump across the electrode and torch tip to heat and create an ionized gas column which issues from the arc constricting orifice as a flame. As the torch head is moved toward a workpiece, a transferred arc jumps from the electrode to the workpiece since the impedance of the current path in the workpiece is lower than the impedance through the welding tip current path. Thus, the ionized particles carried through the tip arc constricting orifice will form a lower resistance path for establishing the main arc to the workpiece.

The purpose of the arc constricting orifice is to project the arc as part of the flow of gas in the shape of a long, laminar or columnar flame. Constricting the arc also tends to accelerate the rate of gas flow as the arc energy is focused as a long, laminar or columnar flame on a workpiece.

The arc will pass from the electrode through the tip arc constricting orifice to the workpiece, as long as that route represents the lowest resistance path. Sometimes, there is a lower resistance path to ground through the torch tip, and this causes the phenomenon known as double arcing. When double arcing occurs, the metallic torch tip forms part of the current path to ground, thereby creating two arcs, one from the electrode to the tip, and the second from the tip to ground. Unfortunately, double arcing results in damage to the tip due to metal melting at the anode and cathode portions of the structure from which the arcs form. The usual causes of double arcing are touching the tip to a workpiece, using two high an arc current for a given tip orifice diameter or using too low a gas flow for a given current.

While it is generally true that plasma arc torches create a long laminar or columnar flame issuing from the arc constricting orifice, what is not generally known is that the typical torch tip is constructed to let the plasma arc expand as it comes out of the arc constricting orifice, thereby causing the distance from the torch tip to the workpiece to be changed. This uncontrolled plasma arc expansion and unintended change in the length of the long, laminar or columnar flame issuing from the arc constricting orifice can also produce double arcing, damaging the torch tip as well as the workpiece. It has also been discovered that the arc established from the electrode may vary, depending on the lowest resistance path. Thus, uniformity and consistency in establishing an arc from the orifice to the workpiece has not been possible with existing constructions.

SUMMARY OF THE INVENTION

Among the several objects and advantages of the present invention include:

The provision of a plasma arc torch which reduces or eliminates double arcing caused by plasma arc expansion as it issues from the arc constricting orifice of a plasma torch tip.

The provision of a plasma gas torch which restricts plasma arc expansion as well as the length of the plasma jet column, and thereby confines and controls a plasma jet column within a predetermined area as it issues from an arc constricting orifice at the tip of the plasma gas torch.

The provision of a plasma gas torch wherein the torch tip end can be simply and easily designed and manufactured to limit both plasma arc expansion and the possibilities of double arcing.

The provision of a plasma gas torch where the arc is established from the center of the electrode through the arc constricting orifice, to provide arc uniformity and consistency.

The provision of such a plasma gas torch wherein the torch tip end can be redesigned without great cost or complexity, and yet provides much longer service life, and thus less down time and lost production costs, as compared with existing plasma gas torches.

These and other objects and advantages will become more apparent from the description that ensues.

Briefly stated, the plasma arc torch of the present invention includes a tip having an elongated hollow body section an end section which extends generally transverse to the elongated hollow body section to define a plenum cavity within the tip. An electrode is positioned within and spaced from the tip within the plenum cavity. An arc constricting orifice of predetermined diameter is formed in the tip end section to permit gas injected into the plenum cavity to issue through the arc constricting orifice. The generally transversely extending torch tip end section is provided with inner and outer surfaces having a predetermined material thickness which delimits the plenum cavity. The outer surface of the tip end section adjacent the arc constricting orifice is provided with an outwardly extending enlarged head portion which becomes smaller in longitudinal dimension as it extends transversely away from the arc constricting orifice as that orifice is defined at the inner surface of the plenum cavity. The configuration of the outwardly extending enlarged head portion is preferably a curvilinear convex projection which has an outwardly extending bell-shaped configuration extending around the arc constricting orifice. Preferably also, the outwardly extending enlarged head portion has a transverse dimension which is less than the transverse dimension of the tip end section so as to merge into a generally transversely extending outer surface area at a distance from the arc constricting orifice. The outwardly extending enlarged head portion is preferably formed as an integral portion of the tip end section.

In addition to the above, the plasma arc torch of this invention includes an electrode positioned within and spaced from the tip within the plenum cavity wherein a central portion of the electrode is in general alignment with an arc constricting orifice and positioned in closest proximity to the tip inner surface adjacent the arc constricting orifice.

A plasma arc torch which is constructed in the aforementioned manner will allow an arc to be established between the tip and electrode in the vicinity of gas passing through the arc constricting orifice to form an ionized plasma jet which is directed past the arc constricting orifice and then outwardly through and extending past the enlarged head portion as a confined and controlled plasma jet column directed toward a workpiece, thereby overcoming the aforenoted deficiencies of the prior art, while achieving the objects and advantages of the present invention now to be described in detail in the ensuing description.

DESCRIPTION OF THE PREFERRED EMBODIMENT

Figure 1:
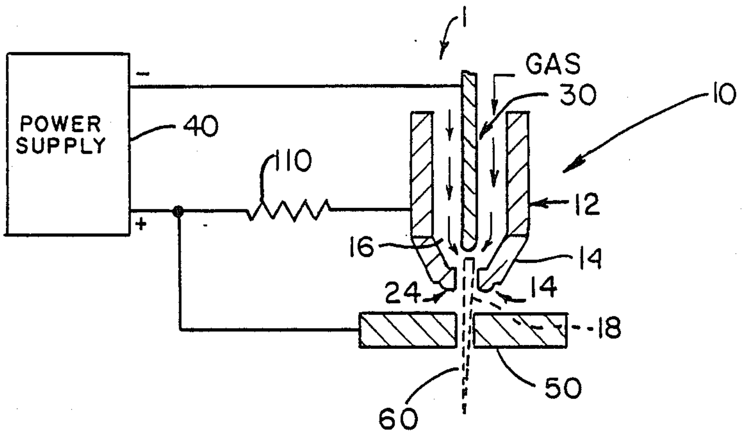
FIG. 1 is a schematic view showing one illustrative embodiment of plasma arc torch constructed in accordance with the teachings of the present invention, in the generic environment typically found in plasma arc metal working processes.

FIG. 1 is a diagramatic illustration of the typical environment in which plasma arc torches are used. As there shown, a plasma arc torch 1 includes a body 10 having an elongated hollow section 12 and a torch tip end section 14. The torch tip end section 14 extends generally transverse to the elongated hollow body section 12 so as to define a plenum cavity 16 within the confines of the tip end section 14. An electrode 30 is positioned within the plenum cavity 16 and spaced from the tip 14, as shown in FIG. 1. An arc restricting orifice 18 of predetermined diameter is formed in the tip end section 14 in general alignment with the electrode 30, but spaced therefrom as shown. A power supply 40 shown on the left side of FIG. 1 provides current to create an arc between the electrode 30 and the torch tip end section 14, as gas is issued through the arc constricting orifice 18.

When an arc is established through a gaseous column between the electrode 30 as a cathode and the tip end section 14 as an anode, some of the gas molecules in the gaseous column become ionized. This ionized zone, called plasma, is the current conducting section of the arc and is kept hot by the resistance heating effect of current passing through it. All plasma torches operate on essentially the same principle. That is, the arc is constricted by passing it through the arc constricting orifice 18 as it travels away from the electrode 30 to a workpiece generally identified by the numeral 50. As the plasma arc torch body 10 is moved toward the workpiece 50, a transferred arc jumps from the electrode 30 to the workpiece 50 since the impedance of the current path in the workpiece is lower than the impedance through the torch tip current path, which is limited due to a pilot resistor 110. Thus, the ionized particles carried through the arc constricting orifice 18 will establish the main arc, generally identified by the numeral 60, to the workpiece 50 for performing any of a variety of plasma metal working processes that may be desired. In FIG. 1, the arc 60 issuing from the arc constricting orifice 18 is shown as passing through the workpiece 50, as in a cutting operation, it being understood that the present invention can be used with other plasma arc metal working processes heretofore described. Those skilled in the art will also appreciate that various changes and modifications may be made in the plasma arc torch. For example, water cooling, variations in the type of power source used, use of a shielding gas, and other similar well known features may be employed, if desired.

Figure 2:
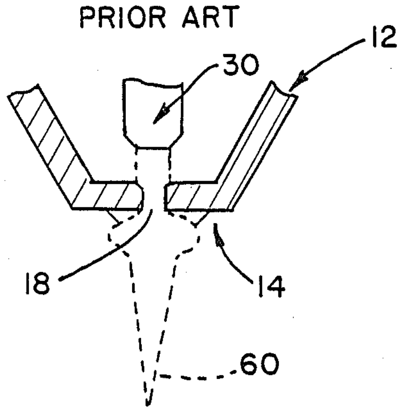
FIG. 2 is an enlarged fragmentary sectional view showing a prior art construction of a plasma arc torch tip end, and the problems encountered thereby.

A fragmentary sectional view of the torch end or tip for a typical prior art plasma arc torch is illustrated in FIG. 2. As represented by dotted lines, the arc 60 issuing from the arc constricting orifice 18 is shown as having a tendency to transversely or laterally expand as it comes out of arc constricting orifice 18. This transverse or lateral expansion can cause a variation in the length of the arc column 60. Therefore, the distance from the tip end section 14 to the workpiece is changed. Change in that distance can cause double arc damage to the work, as well as double arc damage to the torch itself.

Figure 5:
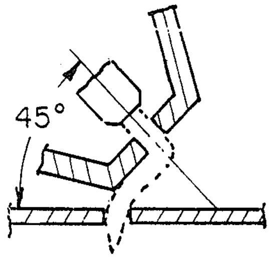
FIG. 5 is an enlarged fragmentary sectional view showing a prior art construction of a plasma arc torch tip, illustrating additional problems with such constructions.

In addition, prior art torch designs encounter problems when the tip 14 is not maintained perpendicular to the workpiece, as shown, for example in FIG. 5. This relative position occurs, for example, during bevel cutting of the workpiece. With prior art designs, the ar attempts to take the shortest distance to the workpiece, which is along the tip 14. That use generally reduces the life of the tip 14. The tip life problem is substantially overcome because of the invention disclosed herein.

In accordance with an important feature of the present invention, the generally transversely extending torch tip end section 14 includes inner and outer surfaces 20 and 22 respectively which are inside and outside of the plenum cavity 16. The outer surface 22 of the tip end section 14 adjacent the arc constricting orifice 18 is provided with an outwardly extending enlarged head portion 24 which becomes smaller in longitudinal dimension as it extends transversely away from the arc constricting orifice 18 as defined at the surface 20. Preferably, the outwardly extending enlarged head portion 24 comprises a curvilinear and convex shaped projection which takes the shape of an outwardly extending bell-shaped configuration which extends around the arc constricting orifice 18, as shown. It will no doubt be appreciated that various other shapes and configurations may be employed within the scope and teachings of the present invention. Preferably, the outwardly extending enlarged head portion 24 is integrally formed along with the inner and outer surfaces 20 and 22 as the unitary tip end section 14, during manufacture of the tip 14, although it is conceivable that the outwardly extending enlarged head portion 24 may be formed separately and subsequently added.

Figure 3:
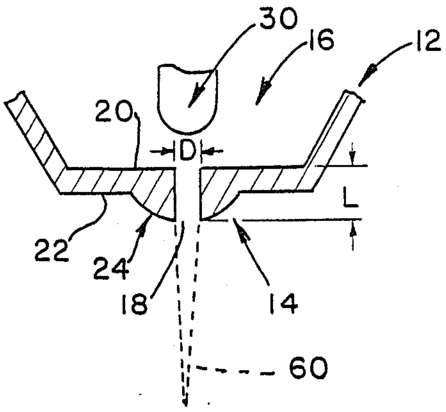
FIG. 3 is an enlarged fragmentary sectional view of the plasma arc torch of FIG. 1, which incorporates the teachings and construction of the present invention.

It should be noted also that the arc constricting orifice 18 through which the arc passes has two main dimensions, an orifice diameter represented by the letter D and a throat length which is represented by the letter L. While the diameter D of the arc restricting orifice 18 does not change from prior art constructions, the throat length L, in accordance with the present invention, has been substantially lengthened as a result of the outwardly extending enlarged head portion 24, as is best observed in FIG. 3.

Thus, not only is the plasma jet or arc column 60 more confined and controlled as a result of the longer throat length L, curvilinear convexly shaped enlarged head 24 does not facilitate arc travel transversely or laterally of the arc column 60. As best understood presently, the shape or configuration of the outwardly extending enlarged head portion 24 provides little or no surface along which the arc can be expanded because the shortest distance to the workpiece is always along the orifice 18. As a result, when an arc is established between the tip 14 and the electrode 30 in the vicinity of the gas passing through the arc constricting orifice 18, it forms an ionized plasma jet which is directed past the arc constricting orifice 18 and the outwardly extending enlarged head portion 24 to provide a confined and controlled plasma jet arc column 60 flowing toward the workpiece 50. The phenomenon of double arcing which can result from a changing arc length such as shown in the prior art constructions of FIGS. 2 and 5 are therefore, minimized or eliminated. Not only can the torch tip end section be simply and easily designed and manufactured in accordance with the teachings of the present invention, in actual use, plasma arc torches so constructed will have a much longer service life, thus minimizing down time and lost production costs that are associated with existing plasma arc torches.

Figure 4:
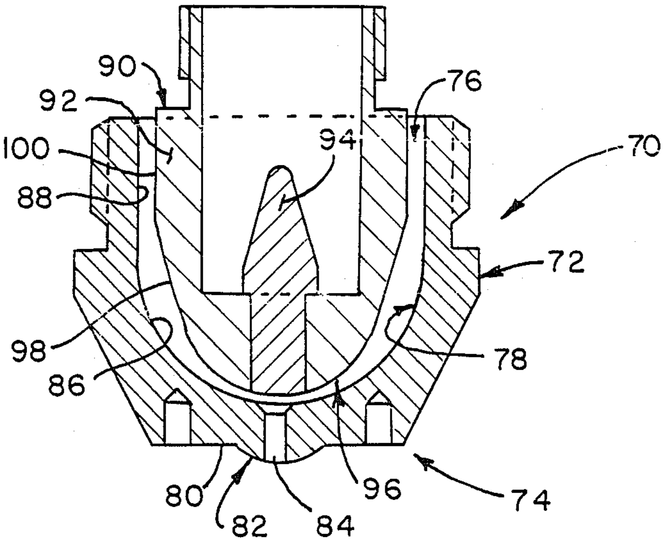
FIG. 4 is an enlarged fragmentary sectional view of a modified form of plasma arc torch which also incorporates the teachings and construction of the present invention.

A modified form of the plasma arc torch is shown in FIG. 4 of the drawings. The plasma arc torch includes a body 70 having an elongated hollow tip 72 and a torch tip end section 74 which extends generally transverse to the elongated hollow tip 72 and defines a plenum cavity 76 within the confines of the body 70. The torch tip end section 74 includes inner and outer surfaces 78 and 80 respectively, which are inside and outside of the plenum cavity 76. The outer surface 80 of the tip end section 74 is provided with an enlarged head portion 82 which surrounds an arc constricting orifice 84 that extends between the inner and outer surfaces 78 and 80 respectively. The enlarged head portion 82 and related arc constricting orifice 84 function together in the same way as the enlarged head 24 and arc constricting orifice 18 of the FIGS. 1 and 3 embodiment of the present invention.

The inner surface 78 of the embodiment shown in FIG. 4 has a semi-spherically shaped lower inner surface 86 and a cylindrically shaped upper surface 88, for complementary interfitting association of an electrode 90. The electrode 90 has a body or housing 92, provided with a suitable insert 94. The insert 94 is centrally positioned relative to a ball end portion 96 of the electrode 90. The outer curvilinear slope of the ball end portion 96 has a smaller radius of curvature than the inner curvilinear slope of the inner surface 86 of the torch tip end section 74.

The construction and arrangement of the tip 72 and electrode 90 is such that a central portion of the electrode 90, corresponding to the insert 94 along the ball end portion 96, is in general alignment with the arc constricting orifice 84 in the area of closest proximity to the inner surface 86 of the torch tip end section 74 which is adjacent the arc constricting orifice 84, and the distance increases relatively rapidly as one moves radially outwardly from the orifice 84. This enables the arc from the electrode 90 to be started in the center of the electrode 90, corresponding to the centrally located insert 94, for arc uniformity and consistency through the arc constricting orifice 84. Establishing the arc in the center of the electrode 90 is also assisted, as indicated, by increasing the distance of the electrode 90 from the inner surface 86 of the torch tip end section 74 as ball end portion 96 of the electrode 90 extends away from the central portion thereof containing the insert 94.

The electrode 90 further includes a frusto-conical section 98 adjacent the ball end portion 96 which spaces the electrode 90 even a greater distance from the inner surface 86. At an uppermost area of the electrode 90 is a cylindrical collar section 100 which is smaller than, but complementary configured relative to the cylindrically-shaped upper inner surface 88 of the tip 72. This arrangement dictates that the arc is established and maintained along the center of the ball end portion 96 of the electrode 90.

In view of the above, it will be seen that the objects of this invention are achieved and other advantageous results are obtained.

As various changes could be made in the above constructions without departing from the scope of the invention it is intended that all matter contained in the above description and shown in the accompanying drawings shall be interpreted as illustrative and not in a limiting sense.

Having thus described the invention, what is claimed and desired to be secured by Letters Patent is:

1. A plasma arc torch comprising a body having an elongated hollow section and a tip end section extending generally transversely thereto defining a plenum cavity within the tip, an electrode positioned within an spaced from the tip within the plenum cavity, an arc constricting orifice of predetermined diameter formed in the tip end section to permit gas injected into the plenum cavity to issue through said arc constricting orifice, said generally transversely extending end section having generally transversely directed and parallel inner and outer surfaces which are respectively inside and outside of said plenum cavity, the outer surface of the tip end section immediately adjacent the arc constricting orifice having an outwardly extending, semi-spherically shaped enlarged head portion which extends about the arc constricting orifice in a circumferential and curvilinear semi-spherical path toward and merging into the generally transversely directed outer surface of the tip end section, the transverse dimension of said semi-spherically shaped enlarged head portion being substantially smaller than the generally transversely directed outer surface of the tip end section, said arc constricting orifice or predetermined diameter also having a throat length which is defined by the longitudinal dimension between the inner and outer surfaces of the tip end section within the diameter of the arc constricting orifice, said throat length being increased by the enlarged longitudinal dimension of the outwardly extending, semi-spherically shaped enlarged head portion immediately adjacent the arc constricting orifice, whereby an arc established between the tip and electrode in the vicinity of gas passing through the plenum cavity forms an arc which is directed through the arc constricting orifice as a confined and controlled plasma jet column flowing toward a workpiece, by the aforesaid structure and arrangement of the outwardly extending, semi-spherically shaped enlarged head portion.

2. The plasma arc torch as defined in claim 1 wherein said outwardly extending, semi-spherically shaped enlarged head portion has a longitudinal dimension throughout the circumferential and curvilinear path thereof which is greater than the width of the arc constricting orifice.

3. The plasma arc torch as defined in claim 1 wherein the outwardly extending enlarged head portion is integrally formed along with said inner and outer surfaces as a unitary tip end section.

4. A plasma arc torch comprising a body having an elongated hollow section and a tip end section extending generally transversely thereto defining a plenum cavity within the tip, an arc constricting orifice of predetermined diameter formed in the tip end section to permit gas injected into the plenum cavity to issue through said arc constricting orifice, said generally transversely extending end section having inner and outer surfaces which are respectively inside and outside of said plenum cavity, an electrode positioned within and spaced from the tip within the plenum cavity, said electrode having a ball portion including a central part thereof which is in general alignment with said arc constricting orifice and is positioned in closest proximity to the inner surface of said generally transversely extending end section adjacent said arc constricting orifice, said electrode being spaced further from said inner surface in areas spaced from said arc constricting orifice, and the outer surface of the tip end section immediately adjacent the arc constricting orifice having an outwardly extending, semi-spherically shaped enlarged head portion which extends about the arc constricting orifice in a circumferential and curvilinear semi-spherical path toward and merging into the generally transversely directed outer surface of the tip end section, the transverse dimension of said semi-spherically shaped enlarged head portion being substantially smaller than the generally transversely directed outer surface of the tip end section, said arc constricting orifice of predetermined diameter also having a throat length which is defined by the longitudinal dimension between the inner and outer surfaces of the tip end section within the diameter of the arc constricting orifice, said throat length being increased by the enlarged longitudinal dimension of the outwardly extending, semi-spherically shaped enlarged head portion immediately adjacent the arc constricting orifice, whereby an arc established between the tip and electrode in the vicinity of gas passing through the plenum cavity forms an arc which is directed through the arc constricting orifice as a confined and controlled plasma jet column flowing toward a workpiece, by the aforesaid structure and arrangement of the outwardly extending, semi-spherically shaped enlarged head portion.

5. The plasma arc torch as defined in claim 4, wherein the distance between the electrode and said tip on opposite sides of the central portion of said electrode increases as it extends away from the central part of said electrode.

6. The plasma arc torch as defined in claim 5 wherein an outer curvilinear shape of the electrode has a smaller radius of curvaturethan an inner curvilinear shape of the inner surface of said generally transversely extending end section.

7. The plasma arc torch as defined in claim 6 wherein said electrode includes a frusto-conical section adjacent its outer curvilinear shape, which is spaced even further from the inner curvilinear shape of the inner surface of said generally transversely extending end section.

8. The plasma arc torch as defined in claim 7 wherein said electrode comprises an insert within a housing, said insert comprising the central portion of said electrode.

* * * * *

UNITED STATES PATENT AND TRADEMARK OFFICE

CERTIFICATE OF CORRECTION

PATENT NO. : 4,864,097

DATED : September 5, 1989

INVENTOR(S) : Manfred J. Wallner

It is certified that error appears in the above-identified patent and that said Letters Patent is hereby corrected as shown below:

Column 4, line 28, "ar" should be --arc--.

Column 6, lines 28-29, "within an spaced" should be --within and spaced--.

Signed and Sealed this

Second Day of October, 1990

*Attest:*

HARRY F. MANBECK, JR.

*Attesting Officer*

*Commissioner of Patents and Trademarks*